Sept. 20, 1932.  E. C. SMALLY  1,878,608
CONNECTION FOR ILLUMINATING DEVICES
Filed April 2, 1931
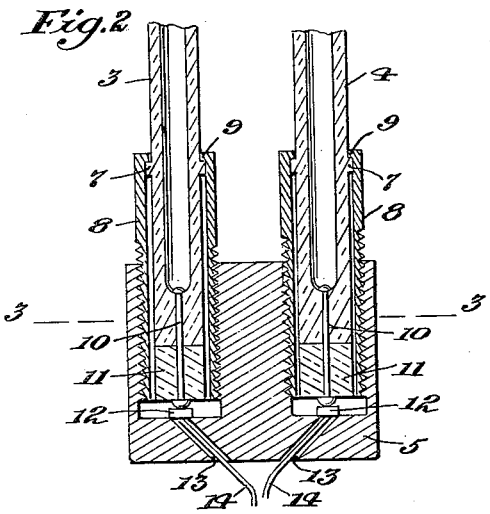
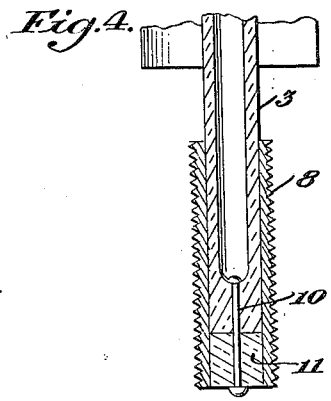
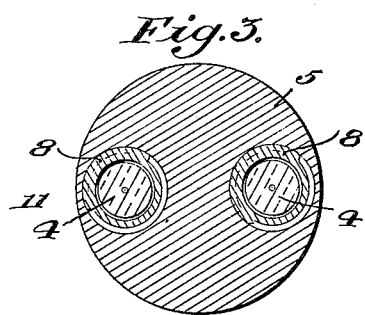
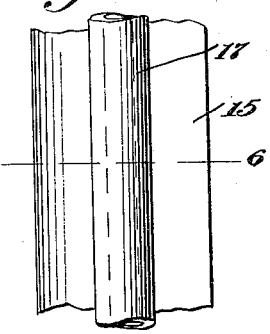
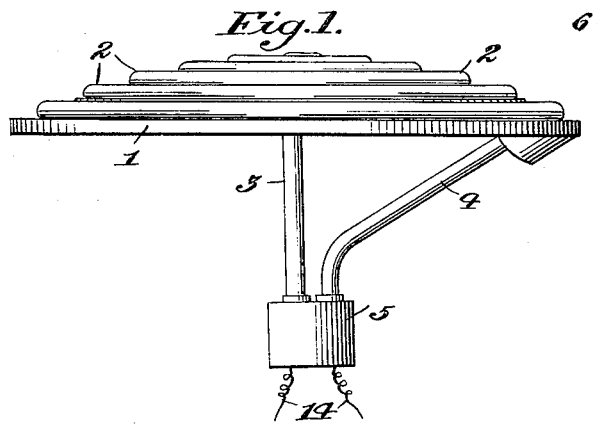
Inventor:
Emanuel C. Smally,
by Jas L. Skidmore
Att'y.

Patented Sept. 20, 1932

1,878,608

UNITED STATES PATENT OFFICE

EMANUEL C. SMALLY, OF CANTON, OHIO

CONNECTION FOR ILLUMINATING DEVICES

Application filed April 2, 1931. Serial No. 527,308.

This invention pertains to a new and improved connection for fixedly securing the terminal ends of the glass tubing utilized in connection with illuminating devices of various kinds, especially in connection with an illuminating device of the type such as is shown by the accompanying drawing and hereinafter described.

The prime object of this invention is to provide a simple, durable, economical and thoroughly efficient connection that will safely, securely and fixedly maintain the terminal ends of glass luminous tubing and its electrical connections within a single member or unit.

Another object of the invention is to so construct my novel connection that it will serve to properly protect the glass terminal ends of the glass tubing as well as its electrical connections.

The foregoing and such other objects as may appear from the ensuing description are attained by the construction, arrangement, location and combination of the several parts hereinafter more fully described, illustrated in the accompanying drawing and particularly pointed out in the claims appended hereto, it being understood that slight changes in the precise shape, proportions, and minor details to the precise construction may be resorted to without departing from the spirit or sacrificing any of the advantages of the invention.

In the accompanying drawing forming a part of this specification it will be seen that:

Figure 1 is an elevation of one of the types of illuminating devices embodying my invention.

Figure 2 is a sectional elevation of my improved connection for illuminating devices.

Figure 3 is a cross-section taken in the plane of the dotted lines 3—3, Fig. 2.

Figure 4 is a sectional elevation showing one terminal end of the glass luminous tubing with a threaded sleeve surrounding said end with the electrode attached thereto, showing in full lines a portion of the reflector to which the glass tubing is fixedly united.

Figure 5 is a plan showing a portion of the glass reflector and glass tubing, and Figure 6 is a cross-section taken in the plane of the dotted lines 6—6, Fig. 5.

In the embodiment of my invention as illustrated, it will be seen by reference to Fig. 1 that the numeral 1 designates the glass reflector forming a part of the illuminating device, coiled upon the upper and outer surface of said reflector is a glass luminous tubing 2 that is fixedly secured to said reflector by annealing, or other suitable means, so that the reflector and tubing form a single integral unit.

It will be perceived that one terminal end portion 3 of the tubing 2 is passed through an opening formed centrally through the reflector 1, while the other terminal end portion 4 of the tubing is bent inwardly from the peripheral portion of said reflector and led to a single socket member 5 forming the connection for the terminals of the luminous glass tubing. Each end portion of the said tubing is provided with an annular flange or extension 7 and is surrounded by an exteriorly externally screw-threaded sleeve member 8 formed of any suitable material, said sleeve member being provided with an inwardly extended annular flange 9 adapted to engage with the extension 7 formed on each terminal portion of the glass tubing, and disposed centrally within each end portion of the said tubing is an electrode 10 which is passed through a washer or plug member 11 formed of any suitable insulating material, said electrode being provided with a headed lower end portion adapted to engage with an electric contact member 12 seated upon the inner upper surface of the member 5, said member 5 being openings 13 formed through its base portion for the reception of the electric wires 14 leading to the said contact member 12, the said wires 14 leading from the socket member 5 to any suitable source of electrical current, not shown.

The socket member is formed of any suitable material, preferably from hard rubber, or a suitable hard insulating fibre, and is provided with two internally threaded socket portions, one at each side of its solid central portion, each socket portion being adapted for the reception of each terminal of the luminous glass tubing, the sleeve surrounding said tubing and the electric connections leading to said tubing terminals.

It will be understood that the luminous glass tubing is filled with neon gas or any other suitable illuminating gas, which when ignited by the electric current passing therethrough will produce a luminous lighting effect such as is well known in the illuminating art.

By reference to Figs. 5 and 6 it will be seen that a modified form of reflector is shown consisting of a single curved plate or slab of glass 15, provided with a silvered coating 16 over its outer surface, and secured centrally to its inner surface by annealing or any other suitable method, the glass luminous tubing 17 is permanently united thereto, the tubing and reflector forming a single unitary structure.

It will be readily evident that by the particular structure of the socket member 5 hereinbefore described the terminals of the glass tubing, the sleeve surrounding each terminal, the insulating plug, and the electrical connections will be safely and properly united and protected by a single member, said member serving to maintain the several parts always in proper contact with relation to each other.

The member 5 may be formed in any desired shape or contour, but is preferably of circular formation with a threaded socket portion disposed at each side of its central portion for the reception of each sleeve, and each glass terminal, as well as the electrical connections.

Having thus described my invention what I claim and desire to secure by Letters Patent is:

1. A connection for the terminal ends of the luminous glass tubing of an illuminating device, comprising an externally threaded sleeve for the reception of each terminal, an insulating plug disposed at the end of each terminal, an electrode disposed centrally within each end of each terminal and passing through each of said plugs, and a socket member for uniting said parts within a single unit.

2. A connection for the glass terminal ends of the tubing of an illuminating device, said terminal ends being formed with an annular extension near the end portion of each terminal, an externally threaded sleeve adapted to surround each end portion of each terminal and engage said annular extension, electrical means connected with each end of each terminal, and a member forming a unitary structure for uniting all of the said parts thereon.

3. A connection for the terminal end of glass tubing of an illuminating device, comprising a sleeve surrounding the terminal, positive means formed on the sleeve for holding the terminal end of the tubing against longitudinal movement therein, electrical means connected to the end of the terminal, and a socket member in which the sleeve is secured.

4. A connection for the terminal ends of glass tubing of an illuminating device, comprising a sleeve surrounding each terminal end, positive means formed on each sleeve for holding the terminal end of the glass tubing against longitudinal movement therein; electrical means connected to each terminal end of the tubing, and a double socket member forming a single unit for uniting the said parts together.

5. A connection for an illuminating device of the character described, comprising a single member formed with two internally threaded sockets, an externally threaded sleeve mounted in each of the sockets, and positive means formed upon each sleeve for engaging the terminal ends of a glass luminous tubing for preventing longitudinal movement thereof.

6. A connection for the terminal ends of the glass tubing of an illuminating device, said terminal ends having an annular extension formed thereon, an externally threaded sleeve surrounding each terminal and provided with a collar for engaging the annular extension of the terminal, and a single piece socket member formed with two internally threaded sockets for the reception of the sleeves and terminals for uniting said parts.

7. A connection for a terminal of the glass tubing of an illuminating device, said terminal having an annular extension formed thereon near its end, a threaded sleeve rotatably mounted upon the terminal end portion of the tubing having an internal collar for engagement with said annular extension, a threaded socket for the reception of said sleeve, and electrical means disposed in the socket for connection to the terminal.

EMANUEL C. SMALLY.